United States Patent
So et al.

(10) Patent No.: US 10,608,331 B2
(45) Date of Patent: Mar. 31, 2020

(54) ANTENNA DEVICE FOR MOBILE COMMUNICATION SYSTEM

(71) Applicant: KMW INC., Hwaseong, Gyeonggi-do (KR)

(72) Inventors: Sung-Hwan So, Gyeonggi-do (KR);
Seong-Man Kang, Gyeonggi-do (KR);
Eun-Suk Jung, Gyeonggi-do (KR);
Sang-Hun Lee, Gyeonggi-do (KR);
Dae-Myung Park, Seoul (KR)

(73) Assignee: KMW INC., Hwaseong-si (KR)

( * ) Notice: Subject to any disclaimer, the term of this patent is extended or adjusted under 35 U.S.C. 154(b) by 142 days.

(21) Appl. No.: 15/449,496

(22) Filed: Mar. 3, 2017

(65) Prior Publication Data
US 2017/0179589 A1    Jun. 22, 2017

Related U.S. Application Data

(63) Continuation of application No. PCT/KR2015/008980, filed on Aug. 27, 2015.

(30) Foreign Application Priority Data

Sep. 5, 2014    (KR) ........................ 20-2014-0006622

(51) Int. Cl.
*H01Q 15/14*    (2006.01)
*H01Q 1/42*    (2006.01)
(Continued)

(52) U.S. Cl.
CPC ............... *H01Q 1/42* (2013.01); *H01Q 1/246* (2013.01); *H01Q 15/14* (2013.01); *H04W 88/08* (2013.01)

(58) Field of Classification Search
CPC .......... H01Q 1/42; H01Q 1/246; H01Q 15/14; H01Q 1/281; H01Q 1/40; H01Q 1/405; H01Q 1/425; H04W 88/08
See application file for complete search history.

(56) References Cited

U.S. PATENT DOCUMENTS 5,757,324 A * 5/1998 Helms ...................... H01Q 1/42
343/700 MS
5,808,585 A * 9/1998 Frenzer ..................... H01Q 1/42
343/872
(Continued)

FOREIGN PATENT DOCUMENTS

EP        1954469 B1 * 6/2014 ......... B29C 47/0019
KR    10-2005-0088753 A    9/2005
(Continued)

*Primary Examiner* — Hai V Tran
*Assistant Examiner* — Bamidele A Jegede

(57) ABSTRACT

The present disclosure relates to an antenna device for a mobile communication system, including a reflection plate, a service band separator/coupler and a radome. The reflection plate is configured in a plate shape, multiple radiation elements being mounted on one surface of the reflection plate so as to transmit/receive radio signals. The service band separator/coupler is installed on the other surface of the reflection plate so as to separate/couple the service band of the corresponding antenna device. The radome is configured in the shape of an integrated barrel that surrounds the reflection plate and the service band separator/coupler as a whole.

7 Claims, 8 Drawing Sheets

(51) Int. Cl.
*H01Q 1/24* (2006.01)
*H04W 88/08* (2009.01)

(56) References Cited

U.S. PATENT DOCUMENTS

| | | | | |
|---|---|---|---|---|
| 5,905,465 | A * | 5/1999 | Olson | H01Q 1/246 |
| | | | | 343/700 MS |
| 6,133,883 | A * | 10/2000 | Munson | H01Q 1/38 |
| | | | | 343/700 MS |
| 6,252,553 | B1 | 6/2001 | Solomon | |
| 6,462,710 | B1 * | 10/2002 | Carson | H01Q 21/065 |
| | | | | 343/700 MS |
| 8,619,677 | B2 | 12/2013 | Kim et al. | |
| 9,130,271 | B2 | 9/2015 | Ma et al. | |
| 9,363,905 | B2 | 6/2016 | Myers et al. | |
| 2001/0054983 | A1 * | 12/2001 | Judd | H01Q 1/246 |
| | | | | 343/810 |
| 2004/0150561 | A1 * | 8/2004 | Tillery | H01Q 1/085 |
| | | | | 343/700 MS |
| 2007/0290938 | A1 * | 12/2007 | Loyet | H01Q 1/246 |
| | | | | 343/795 |
| 2008/0088521 | A1 * | 4/2008 | Le | H01Q 3/16 |
| | | | | 343/818 |
| 2009/0305710 | A1 * | 12/2009 | Johnson | H01Q 1/246 |
| | | | | 455/446 |
| 2010/0134374 | A1 * | 6/2010 | Skalina | H01Q 1/246 |
| | | | | 343/798 |
| 2011/0006966 | A1 * | 1/2011 | Tanabe | H01Q 1/246 |
| | | | | 343/853 |
| 2011/0176462 | A1 * | 7/2011 | Kim | H01Q 1/246 |
| | | | | 370/281 |
| 2011/0299299 | A1 * | 12/2011 | Kim | G02B 6/0011 |
| | | | | 362/612 |
| 2012/0280874 | A1 * | 11/2012 | Kim | H01Q 1/246 |
| | | | | 343/763 |
| 2015/0222012 | A1 * | 8/2015 | Van Zeijl | G01S 7/032 |
| | | | | 343/848 |

FOREIGN PATENT DOCUMENTS

| | | | |
|---|---|---|---|
| KR | 10-2006-0016603 A | 2/2006 | |
| KR | 100611806 B1 * | 8/2006 | ............... H01Q 13/08 |
| KR | 10-2008-0005786 A | 1/2008 | |
| KR | 10-2010-0035567 A | 4/2010 | |
| KR | 10-2010-0109761 A | 10/2010 | |
| KR | 10-2013-0000410 A | 1/2013 | |

* cited by examiner

ANTENNA DEVICE FOR MOBILE COMMUNICATION SYSTEM

CROSS REFERENCE TO RELATED APPLICATIONS

This application is a continuation of an International Application No. PCT/KR2015/008980 filed on Aug. 27, 2015, which claims priority to Korean Patent Application No. 20-2014-0006622 filed on Sep. 5, 2014, the entire disclosures of which are incorporated herein by reference.

TECHNICAL FIELD

The present disclosure relates to an antenna device applicable to a base station or a relay station in a mobile communication (PCS, cellular, CDMA, GSM, LTE, etc.) network.

BACKGROUND

Generally, a base station of a mobile communication system has been divided into a base station main unit configured to process transmit and receive signals and an antenna device including a plurality of radiating elements to transmit/receive radio signals. Usually, the base station main unit is installed at a low position on the ground, and the antenna device is installed at a high position such as a building roof or a tower, and the base station main unit and the antenna device may be connected to each other through a feeder cable or the like.

In recent years, in order to compensate for cable loss in signal transmission between the antenna and parts of the base station main unit according to enhanced ease of tower installation due to miniaturization and weight reduction of each device for radio signal processing, a structure in which a remote radio head (RRH) responsible for processing transmit and receive radio signals is installed at the front end of the antenna device is widely employed.

FIG. 1 schematically shows an example of devices installable on the side of an antenna device in a typical mobile communication base station. As shown in FIG. 1, a service band separator/combiner 16 is installed at the front end of that the antenna device. Typically, the service band separator/combiner 16 is connected to the antenna device 10 using a cable conforming to the AISG (Antenna Interface Standards Group) standard.

The service band separator/combiner 16, which is provided to additionally distinguish between service bands of the antenna device 10, serves to separate a transmitted signal from the base station main unit into signals according to respective configured service bands and provide the same to the antenna device 10 and also serves to combine signals of respective bands provided from the antenna device 10 and transmit the combined signals to the base station main unit. This service band separator/combiner 16 has a structure of a filter combiner/distributor in which a processing band is appropriately configured for the respective service bands to be separated and/or combined.

The functions of the service band separator/combiner 16 will be described in more detail. In the current mobile communication environment, not only the commercial deployment of 2G (Generation), 3G, 4G LTE (Long Term Evolution) but also the introduction of a 5G system is being considered. Various frequency bands of mobile communication services coexist according to communication systems or communication operators and countries, and the base station environment is diversified. Thereby, service bands are also frequently changed by specific operators. Accordingly, in order to realize an efficient base station system and to reduce the operating cost of the base station, the base station (and the base station antenna device) is provided with a broadband system to cover various service bands. In this environment, the service band separator/combiner 16 is additionally installed at the time of installation of the initial antenna device 10, or when necessary, so as to be able to select an appropriate service band required for a specific operator.

However, additional production and installation of the service band separator/combiner 16 has a problem of material cost and processing cost for the manufacture of a separate device, and also the installation work is difficult and costly. Particularly, in this case, the service band separator/combiner 16 is installed while being additionally connected to the antenna device 10 through a cable. Thereby, the installation is likely to raise problems regarding waterproofing of each connection part and produces a result that is not aesthetically pleasing.

DISCLOSURE

Technical Problem

Therefore, the present disclosure has been made in an effort to provide an antenna device for a mobile communication system for improving a manufacturing method for a service band separator/combiner which may be additionally installed, so as to minimize installation cost as well as material cost and manufacturing cost.

It is another object of the present disclosure to provide an antenna device for a mobile communication system for minimizing a problem caused by an external environmental factor such as waterproofness and an aesthetic problem due to the provision of a service band separator/combiner.

SUMMARY

In accordance with some embodiments of the present disclosure, an antenna device for a mobile communication system includes a reflector having a plate shape and having one surface installed with a plurality of radiating elements for transmitting and receiving radio signals, a service band separator/combiner installed on the other surface of the reflector to separate/combine a service band of the antenna device, and a radome formed in an integrated cylindrical shape to surround the reflector and the service band separator/combiner.

Advantageous Effects

As described above, the antenna device for a mobile communication system according to the present disclosure may reduce installation cost as well as material cost and manufacturing cost by improving a manufacturing method for a service band separator/combiner which may be additionally installed. Therefore, products with price competitiveness may be manufactured by minimizing unnecessary expenditure.

Further, the antenna device for a mobile communication system according to the present disclosure may minimize a problem caused by an external environmental factor such as waterproofness and an aesthetic problem due to the provision of a service band separator/combiner.

DETAILED DESCRIPTION

Hereinafter, at least one embodiment of the present disclosure will be described in detail with reference to the accompanying drawings. In the following description, specific details such as specific components are introduced. It will be apparent to those skilled in the art that the specific details are provided to facilitate understanding of the present disclosure and specific modifications to and variations in those specific details may be made without departing from the scope of the present disclosure.

Figure 2:
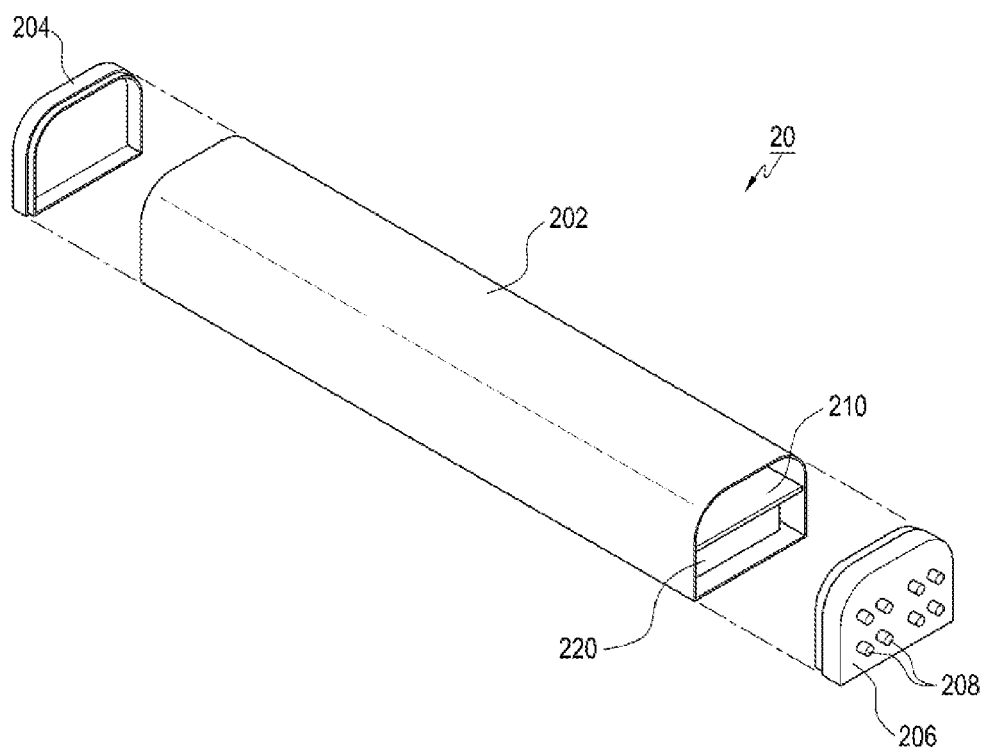
FIG. 2 is a partially exploded schematic perspective view of an antenna device for a mobile communication system according to a first embodiment of the present disclosure.
Figure 3:
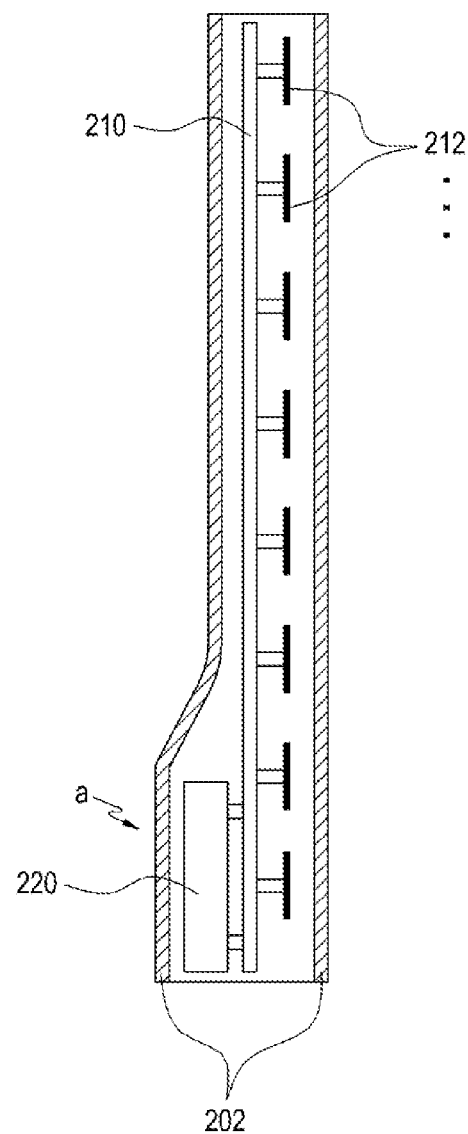
FIG. 3 is a side view of the internal structure of the main parts of FIG. 2.

FIG. 2 is a partially exploded schematic perspective view of an antenna device for a mobile communication system according to a first embodiment of the present disclosure. FIG. 3 is a side view of the internal structure of the main parts of FIG. 2. Referring to FIGS. 2 and 3, an antenna device 20 according to an embodiment of the present disclosure is formed in the shape of a metal plate having a relatively large area, and includes a reflector 210 having a plurality of radiating elements 212 for transmitting and receiving a radio signal mounted on one surface (e.g., a front surface) thereof; a service band separator/combiner 220 installed at, for example, a lower side on the other surface (for example, a rear surface) of the reflector 210 to separate/combine the service band of the antenna device 20; a radome 202 surrounding the reflector 210 and the service band separator/combiner 220 and formed in the shape of an integrated cylinder; and an upper cap 204 and a lower cap 206 for fixing the upper and lower portions of the reflector 210 and sealed and coupled to upper and lower openings of the cylindrical radome 202.

In addition, a feeder circuit and various electronic components (of a relatively small size) (not shown) for processing transmitted and received signals and the like may be added in the radome 202 of the antenna device 20, which are omitted from FIGS. 2 and 3 for simplicity.

The service band separator/combiner 220 is installed at the lower side on the rear surface of the reflector 210, and is therefore adjacent to the lower cap 206. Generally, a plurality of input/output connectors 208 for inputting and outputting transmitted and received signals to and from the antenna device 20 are installed in the lower cap 206. Since the service band separator and coupler 220 is installed adjacent to the input/output connector 208, the connection operation is facilitated. Here, a feeder cable is properly installed among various signal processing devices including the radiating elements 12 inside the antenna device 20, the service band separator/combiner 220 and the input/output connectors 208 of the lower cap 206 such that transmitted and received signals of the corresponding service band pass through the service band separator/combiner 220. Accordingly, the service band separator/combiner 220 serves to separate or combine the service bands of the transmit and receive signals.

The service band separator/combiner 220 may be fixedly installed on the rear surface of the reflector 210 directly or indirectly through screw coupling or the like using a separate auxiliary mounting mechanism or the like.

Figure 1:
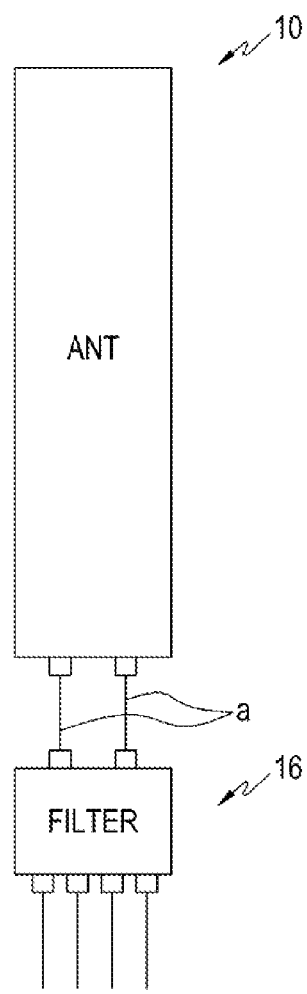
FIG. 1 is a schematic exemplary diagram illustrating devices which may be installed on an antenna device in a conventional mobile communication base station.

In the configuration described above, the cylindrical radome 202 is not of a cylindrical shape having the same size (for example, cross-sectional area and diameter) from the upper side to the lower side, but has a cross-sectional area that is widened at a position, as indicated by "a" in FIGS. 1 and 2, corresponding to a position where the service band separator/combiner 220 is installed on the rear surface of the reflector 210, in order to provide an installation space for the service band separator/combiner 220 (having a relatively large size).

That is, in the present disclosure, the service band separator/combiner 220 is integrated with other components of the antenna device 20 inside the antenna device 20 (the radome 202 of the antenna device 20). The radome 202 is configured to have a cross-sectional area (a) widened only at the corresponding position in order to provide the installation space for the service band separator/combiner 220. As described above, since the service band separator/combiner 220 of the present disclosure is formed integrally with the antenna device 20 inside the radome 202 of the antenna device 20, the problems of the manufacturing process and the manufacturing cost and the problem of the installation work raised by additional installation of the conventional service band separator/combiner on the outside of the antenna may be addressed. Particularly, in this case, compared to the case where the conventional service band separator/combiner is additionally connected to the outside of the antenna device via a separate cable, excellent waterproofness and elegant appearance may be provided.

Considering an attempt to install the service band separator/combiner inside the radome of the antenna, a configuration in which the relatively large-sized service band separator/combiner is installed on the rear surface of the reflector may be primarily considered. Generally, the upper and lower portions of the reflector are supported by the upper cap and the lower cap through the radome, and the radome is installed on the support through a clamp structure (not shown) or the like such that the antenna is supported and installed. Therefore, it may be difficult or complicated to implement the service band separator/combiner on the upper and lower sides of the reflector. Accordingly, the present disclosure proposes a structure in which the service band separator/combiner is installed on the rear surface of the reflector.

Further, the radome is generally formed in a cylindrical shape having a uniform cross-sectional area. This is because the radome is usually manufactured through an extrusion molding process to minimize the manufacturing process time and manufacturing process cost. For example, the radome may be made of synthetic materials such as Fiber Reinforced Plastic (FRP), Acrylonitrile Styrene Acrylate (ASA) or Poly Vinyl Chloride (PVC). The radome is manufactured by melting such synthetic materials and performing extrusion using an extrusion mold. In the case of manufacturing a radome in a cylindrical shape having a uniform cross-sectional area according to such a manufacturing method, the size of the radome should be designed to have a cross-sectional area considering the installation space of the service band separator/combiner. In this case, an extra unnecessary space is created in the radome, in addition to the installation space of the service band separator/combiner.

In contrast, as shown in FIGS. 2 and 3, the configuration of the radome 202 according to features of the present disclosure is designed to additionally provide only a space required for installation of the service band separator/combiner 220 additionally provided inside the antenna device 20 and to have an optimized form in terms of cost saving, weight, product size optimization and installation work. At this time, the other portion of the radome 202, that is, the portion where the service band separator/combiner 220 is not installed, is designed to provide a space required for installation of the reflector 210 and the radiating elements 212 and to have an optimized cross-sectional area (i.e., a cross-sectional area smaller than the widened area a). By configuring the radome 202 in this form, product size may be optimized compared to the radome structure (of a cylindrical shape having an uniform cross-sectional area) which is typically considered. In particular, since the side surface area can be slim, the influence of wind pressure or the like on the radome is minimized.

According to the present disclosure, as described above, in order to provide the radome 202 of a cylindrical shape having a widened cross-sectional area at a position corresponding to a portion for the installation of the service band separator/combiner 220 rather than a cylindrical shape having the same cross-sectional area from the upper side to the lower side, a new manufacturing process, to replace a conventional extrusion molding process, is proposed.

Figure 4A:
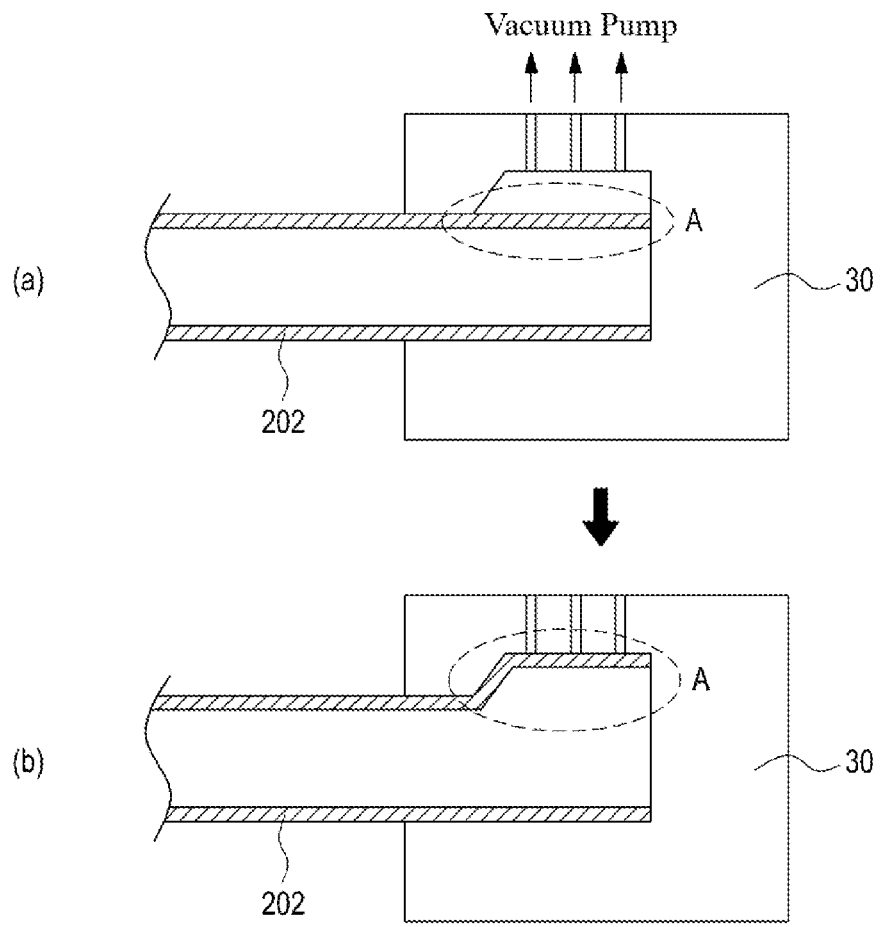
FIGS. 4A and 4B are diagrams for illustrating a main process in manufacturing a radome of the antenna device according to the first embodiment of the present disclosure.
Figure 4B:
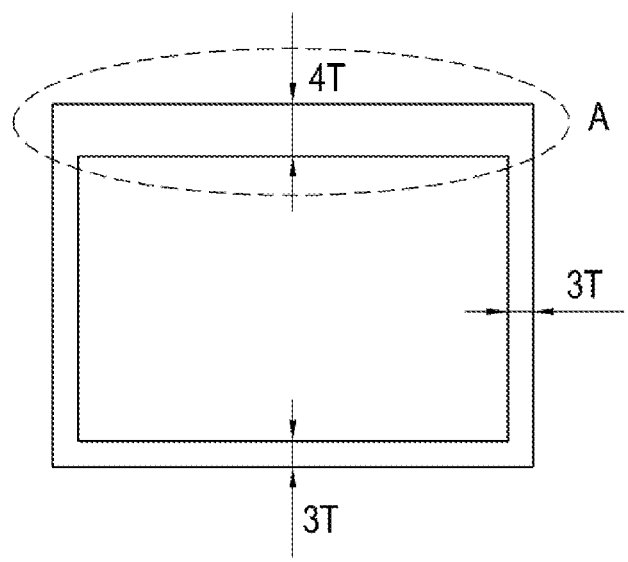

FIGS. 4A and 4B are diagrams for illustrating a main process in manufacturing a radome of the antenna device according to the first embodiment of the present disclosure. FIG. 4A illustrates a main processing procedure, and FIG. 4B shows an cross-sectional shape of a radome during the manufacturing process. Referring to 4A and 4B, the radome manufacturing process according to an embodiment of the present disclosure includes manufacturing a radome in a cylindrical shape using a extrusion molding method and then making a portion A deformed to have a widened cross-sectional area using an "extrusion vacuum molding" method.

In more detail, the radome 202 may first be formed in a cylindrical shape having a uniform diameter through a typical extrusion molding process. Thereafter, as shown in FIG. 4(*a*), heat is applied to the portion A where the cross-sectional area of the radome 202 is widened such that the portions A can be reformed. Then, the radome is provided to a mold apparatus 30 of a predetermined shape.

The mold apparatus 30 is designed to have a mold shape corresponding to the deformed portion A where the cross-sectional area of the radome 202 is widened in advance. Then, as shown in FIG. 4(*b*), a corresponding portion of the radome 202 is adsorbed to the mold using, for example, a vacuum pump to finally form the portion A which is deformed in the radome 202 so as to have an increased cross-sectional area.

Meanwhile, at least the surface of the radome 202 corresponding to the rear surface of the reflector 210 may be formed to be relatively flat. In the example shown in FIG. 4B, the cross-sectional shape of the radome 202 is shown to be approximately rectangular. Regarding the cross-sectional shape of the radome 202 during the manufacturing process shown in FIG. 4B, a surface of the radome 202 corresponding to the deformed portion A, namely, the surface corresponding to the rear surface of the reflector 210 may be formed to be thicker than the other surfaces. In the example of FIG. 4B, the radome 22 may be designed to have a thickness of 3 T (mm). In this case, the surface of the radome 202 corresponding to the deformed portion A may be designed to have a thickness of 4 T (mm).

This is intended to provide a sufficient thickness in advance because, in the radome manufacturing process according to the embodiment of the present disclosure, the radome 202 is first formed to have the same cross-sectional area and then the extrusion vacuum molding is performed secondarily to expand one surface of the radome. According to this process, the thickness of the surface of the radome 202 corresponding to the rear surface of the reflector becomes thicker than the other surface, and the thickness of the deformed portion A becomes similar to the thickness of the other surface of the final product.

Figure 5:
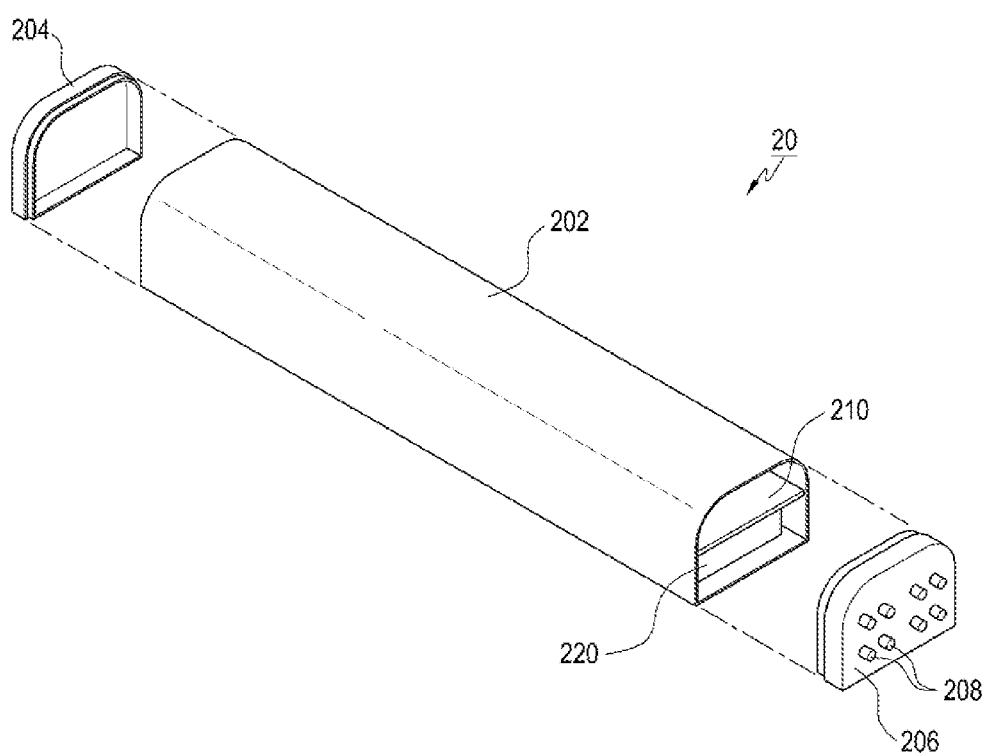
FIG. 5 is a partially exploded schematic perspective view of an antenna device for a mobile communication system according to a second embodiment of the present disclosure.
Figure 6:
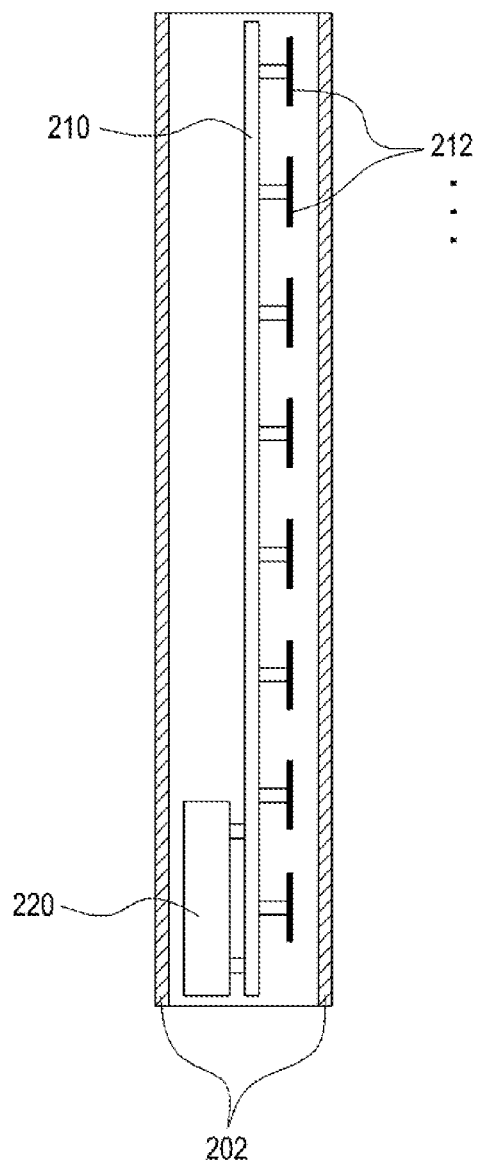
FIG. 6 is a side view of the internal structure of the main parts of FIG. 5.

FIG. 5 is a partially exploded schematic perspective view of an antenna device for a mobile communication system according to a second embodiment of the present disclosure, and FIG. 6 is a side view of the internal structure of the main parts of FIG. 5. Referring to FIGS. 5 and 6, the antenna device according to the second embodiment of the present disclosure, similar to the structure of the first embodiment as shown in FIGS. 2 and 3, includes a reflector 210 having a plurality of radiating elements 212 for transmitting and receiving a radio signal mounted on the front surface thereof; a service band separator/combiner 220 installed at a lower side of the rear surface of the reflector 210; a radome 202 formed in an integrated cylindrical shape; and an upper cap 204 and a lower cap 206 sealably coupled to upper and lower openings of the cylindrical radome 202.

However, the configuration according to the second embodiment of the present disclosure differs from that of the first embodiment in that the cylindrical radome 202 has the same size (for example, the same cross-sectional area) from the upper side to the lower side. The structure according to the second embodiment may make an extra space in the radome, compared to the structure according to the first embodiment, but may be manufactured simply by applying the typical extrusion molding method. In addition, similar to the structure of the first embodiment, the structure according to the second embodiment is superior in waterproofness compared to the conventional case where the service band separator/combiner is provided outside the antenna device.

Figure 7:
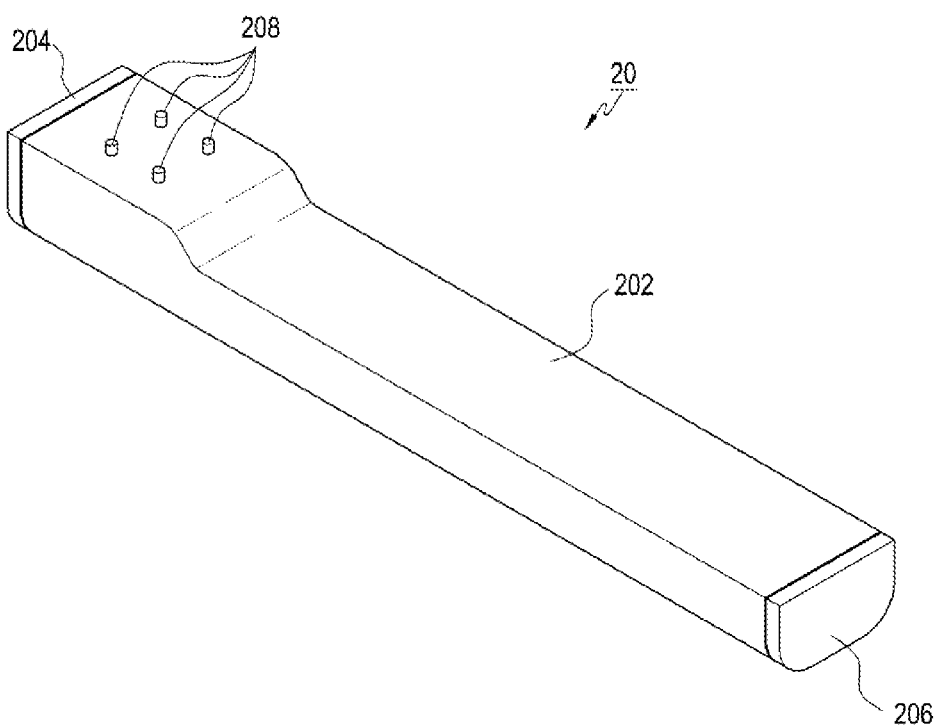
FIG. 7 is a perspective view of an antenna device for a mobile communication system according to a third embodiment of the present disclosure.

FIG. 7 is a perspective view of an antenna device for a mobile communication system according to a third embodiment of the present disclosure. Referring to FIG. 7, similar to the structure of the first embodiment shown in FIGS. 1 and 2, the antenna device according to the third embodiment of the present disclosure includes a service band separator/combiner (not shown) installed on the rear surface of the reflector inside the radome 202, and the radome 202 is configured to be sealed by the upper cap 204 and the lower cap 206.

However, as shown in FIG. 7, the configuration according to the third embodiment of the present disclosure differs from that of the first embodiment in that the service band separator/combiner is installed at, for example, an upper side of the reflector, and thus the radome 202 has a cylindrical shape of a deformed structure in which the cross-sectional area of an upper portion is widened. The size and shape of the upper cap 204 and the lower cap 206 are set to match the structure of the radome 20.

In the third embodiment shown in FIG. 7, unlike the first embodiment, the input/output connector of the antenna device is not provided on the lower cap 206. Instead, the input/output connector 208 is installed on the portion of the radome 202 having an increased cross-sectional area at which the input/output connector 208 is installed. The input/output connector 208 installed as described above is connected to the input/output terminal of the corresponding service band separator/combiner inside the radome 202.

The installation method for the input/output connector 208 described above may provide ease of connection between the input/output connector 208 and the service band separator/combiner, and shorten the length of the connection line as much as possible. In addition, this structure does not require the input/output connector to be provided on the lower cap 206 (or the upper cap), thereby making it possible to manufacture the lower cap 206 and the upper cap 208 in a simpler structure.

Furthermore, the present antenna device 20 employs a multi-antenna structure for providing a multi-service band or a structure for implementing a multi-input multi-output (MIMO) scheme, and thus requires a large number of input/output connectors. However, installing a large number of such input/output connectors on the lower cap 206 or the like causes difficulty in design due to space constraints, and substantially limits the number of installable input/output connectors. In contrast, the structure according to the third embodiment of the present disclosure shown in FIG. 7 may solve this problem since the input/output connector 208 can be installed on, for example, the rear surface of the radome 202.

The configuration and operation of the antenna apparatus for a mobile communication system according to an embodiment of the present disclosure may be implemented as described above. While the present disclosure has been described in connection with what is presently considered to be practical exemplary embodiments, it is to be understood that various variations can be made to the disclosure without departing from the scope of the disclosure. For example, while application of the extrusion vacuum molding method to manufacturing of the radome according to an embodiment of the present disclosure has been described above as an example, it is also possible to apply a blow molding method to form the entire radome shape including the deformed portion A at the same time. In some embodiments, a variable extrusion molding method is used for extruding the radome to have a varied cross-sectional area in the extrusion molding process.

While the service band separator/combiner has been described as being installed on the lower side or the upper side of the rear surface of the reflector according to embodiments of the present disclosure, the service band separator/combiner can be installed at any place of the rear surface of the reflector including the middle portion, and the structure of the radome may be designed correspondingly.

While the input/output connectors have been described in, for example, the third embodiment as being installed on one surface of the radome, the input/output connectors may be installed in the structure of the first embodiment in a similar manner. Alternatively, some of the input/output connectors may be installed on the lower cap, and others may be provided on one surface of the radome.

Although exemplary embodiments of the present disclosure have been described for illustrative purposes, those skilled in the art will appreciate that various modifications, additions and substitutions are possible, without departing from the idea and scope of the claimed invention. Accordingly, one of ordinary skill would understand the scope of the claimed invention is not to be limited by the explicitly described above embodiments but by the claims and equivalents thereof.

The invention claimed is:

1. An antenna device for a mobile communication system, comprising:
   a reflector having a plate shape and having a front surface installed with a plurality of radiating elements for transmitting and receiving radio signals;
   a service band separator/combiner installed on a back surface of the reflector; and
   a radome integrally formed in a substantially rectangular tube shape to surround the reflector and the service band separator/combiner therein,
   wherein the service band separator/combiner separates a service band of a wireless communication system that corresponds to the service band of the antenna device from a transmitted signal from a base station main unit or combines signals of respective bands from the antenna device and transmit the combined signals of respective bands of the wireless communication system to the base station main unit, and
   wherein the radome includes a bulged portion at a position corresponding to the service band separator/combiner, the bulged portion has a substantially rectangular tube shape and a widened cross-sectional area greater than a cross-sectional area of rest of the radome to provide a space to accommodate the service band separator/combiner, and the bulged portion has a same width as the radome and protrudes from a back surface of the radome toward a rearward direction.

2. The antenna device of claim 1, wherein a surface of the radome corresponding to the back surface of the reflector has a thickness greater than the rest surface of the radome, except at least the bulged portion having the widened cross-sectional area.

3. The antenna device of claim 1, wherein an input/output connector of the antenna device is installed at a portion of the radome corresponding to the service band separator/combiner.

4. The antenna device of claim 1, further comprising:
   an upper cap and a lower cap configured to respectively fix an upper portion and a lower portion of the reflector and to be coupled to an upper opening and a lower opening of the radome, wherein the upper cap or the lower cap being sealably coupled to the upper opening or the lower opening of the radome.

5. The antenna device of claim 1, wherein the service band separator/combiner is installed adjacent to an input/output connector of the antenna device on the back surface of the reflector.

6. The antenna device of claim 1, wherein the bulged portion of the radome having the widened cross-sectional area is formed using one method from a group consisting of an extrusion vacuum molding method, a variable extrusion molding method, and a blow molding method.

7. The antenna device of claim 1, wherein the service band separator/combiner is fixed to the back surface of the reflector rearwardly through a separate auxiliary mounting mechanism, and is connected through a feeder cable with at least a part of a plurality of input/output connectors installed on a lower cap and with transmit and receive signal processing devices arranged inside the antenna device to separate or combine service bands of corresponding transmit and receive signals.

\* \* \* \* \*